3,486,561
PROPHYLACTIC ACCESSORY FOR SHOD HOOF
OF A HORSE
Joseph Kulak, 73 Buell St., New Britain, Conn. 06057
Filed July 7, 1967, Ser. No. 651,796
Int. Cl. A01l 5/00, 15/00
U.S. Cl. 168—4                                4 Claims

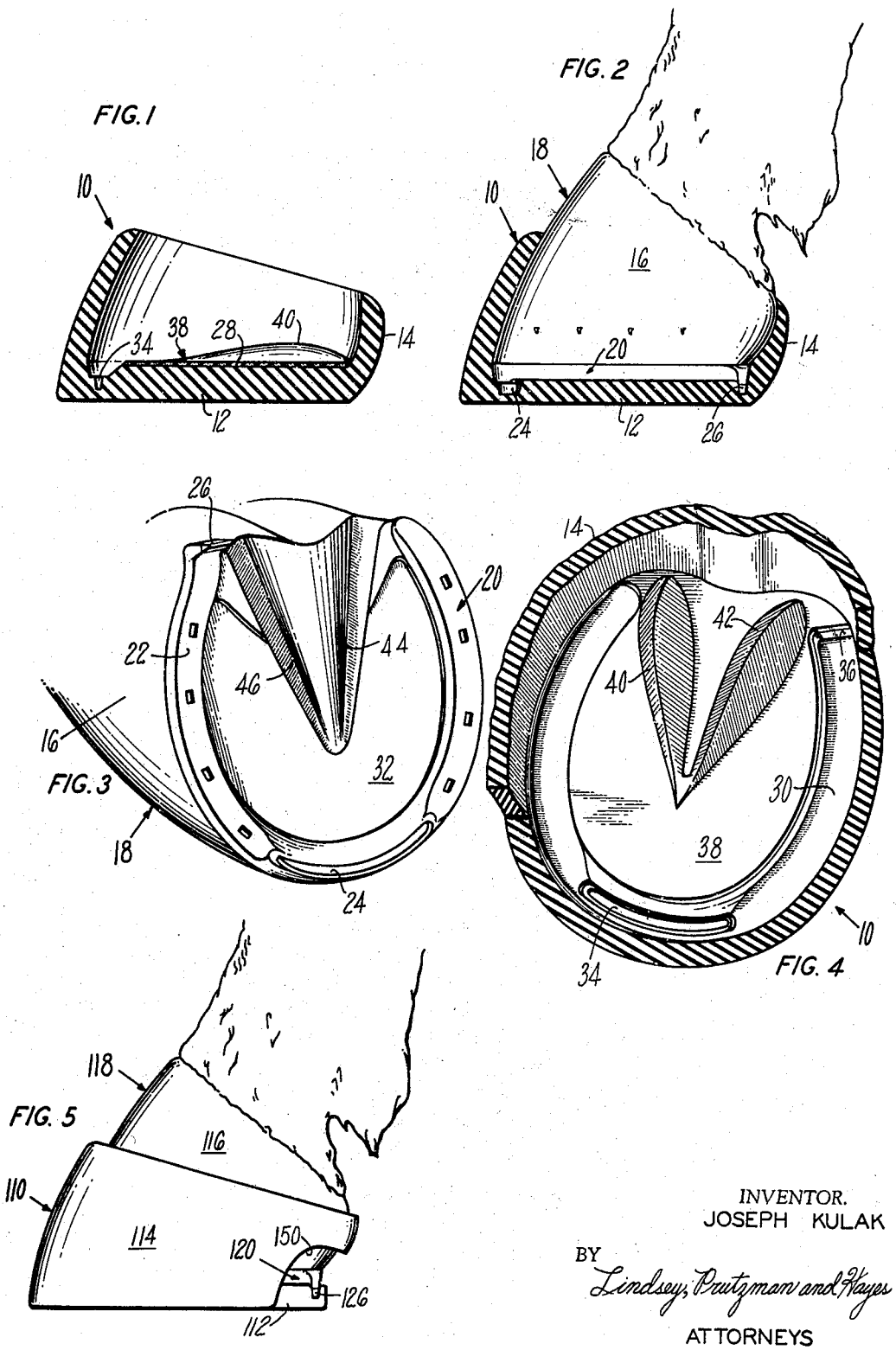
Dec. 30, 1969 — J. KULAK — 3,486,561
PROPHYLACTIC ACCESSORY FOR SHOD HOOF OF A HORSE
Filed July 7, 1967
INVENTOR.
JOSEPH KULAK
BY Lindsey, Prutzman and Hayes
ATTORNEYS

United States Patent Office 3,486,561
Patented Dec. 30, 1969

ABSTRACT OF THE DISCLOSURE

Article having an integral one-piece body formed of a tough resilient material and including a sole and an upstanding annular wall removably attachable to a shod hoof of a horse provided with a horseshoe of varying height, the sole having an upper horseshoe-seating surface matching corresponding portions of the horseshoe such that the sole and the horseshoe body jointly provide an even support for the horse.

---

This invention concerns an accessory attachable to a hoof of a horse for injury preventive purposes as well as for use in correcting existing ailments of a sole of the horse.

A primary object of this invention is to provide a prophylactic accessory removably attachable to a shod hoof of a horse for ensuring that the horse's foot will be normally positioned without tilting when standing or walking on a hard surface even though the horseshoe body is of varying thickness, for example, due to the provision of calks on the shoe.

Another object of this invention is to provide an accessory of the above described type ideally suited to minimize slippage, ankle strain or soreness as well as to protect the hoof from damage or injury when the horse is placed in a stall or being transported.

A further object of this invention is to provide an accessory particularly suited to maintain a medicinal compress, e.g., in place for treatment of injured or damaged tissue on a sole of the horse.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a vertical section view of a preferred embodiment of a prophylactic accessory constructed in accordance with this invention;

FIG. 2 is a view similar to FIG. 1 but showing the accessory mounted on a hoof of a horse;

FIG. 3 is an enlarged bottom view of a shod hoof of a horse;

FIG. 4 is an enlarged fragmentary view, partly broken away, showing an inside portion of the accessory provided with a pad and designed to be fitted onto the shod hoof illustrated in FIG. 3; and FIG. 5 is another embodiment of an accessory shown fitted on the hoof of a horse.

Referring now in detail to the drawing and particularly to FIGS. 1–4, a preferred embodiment of a prophylactic accessory 10 is shown which is made of a suitable tough, resilient material of high impact strength, preferably of elastomeric material. The accessory 10 essentially comprises a sole 12 having an upper annular wall 14 open at its top and integrally joined at its bottom to the periphery of the sole 12. The wall 14 is arcuately curved in cross section to extend upwardly over sidewalls 16 of a horse's hoof 18 in close fitting engagement whereby the accessory is secured by the resiliency of its own material, preferably without the aid of any supplemental straps or other fastening devices.

To ensure that the horse's hoof will remain in a substantially normal position when standing, e.g., on a hard surface even though the hoof 18 is shod with a horseshoe 20 of varying height which would normally cause the foot to tilt (such as the illustrated tread 22 which a projecting toe calk 24 and mud cleat 26), an upper surface 28 of the sole 12 is provided with a horseshoe-seating surface portion 30 substantially conforming in configuration to the tread 22 and defining a marginal sole portion of varying height in inverted relation to that of the horseshoe.

Specifically, the sole 12 completely extends over a sole portion 32 of the horse as well as over the tread 22 of the horseshoe 20, and an interior portion of the sole 12 is shown as being of greater height than the marginal portion of the sole 12. The horseshoe-seating surface portion 30 is shown in the form of a U shaped groove having suitable recesses 34 and 36 for receiving the toe calk 24 and the mud cleat 26, and the bottom of the sole 12 is shown as a flat surface although it will be understood that it may be corrugated if desired for improved traction.

By virtue of the above described construction, the accessory 10 and the horseshoe 20 are of a combined generally uniform height throughout the length of the longitudinal axis of the horseshoe 20 to jointly provide an even support for the horse when standing or walking on a hard surface, e.g., upon being stalled or transported. Accordingly, tilting of the foot is virtually eliminated, thereby minimizing muscle soreness or strain in the ankle area of the horse while also reducing the frequency of removing and replacing shoes, e.g., when the horse is placed in a stall for any length of time.

In addition, the accessory 10 is particularly suited for receiving a pad 38, preferably formed of a soft, elastic foam material, interposed between the upper surface 28 of the sole 12 and the sole portion 32 of the horse. The pad 38 is positioned on the interior portion of the sole 12 inwardly of the horseshoe 20, and the top surface of the pad is shaped to mate with the natural surface contour of the sole portion 32. In this regard, a pair of wedge shaped shoulders 40, 42 of generally triangular cross-section are shown diverging rearwardly from a central part of the pad 38 toward a heel portion of the accessory 10 to closely conform with grooved frog portions 44, 46 of the sole portion 32.

While the pad 38 can be provided as a separate throwaway insert, if desired, it is preferred to bond the pad 38 to the sole 12 by a suitable adhesive for accurate placement and alignment with the corresponding sole and frog portions of the horse's foot whereby a sterile surgical package or medicinal compress, e.g., may be precisely maintained in proper position as required for treatment of injured or diseased tissue on the sole portion 32 of the horse.

In the embodiment of the invention illustrated in FIG. 5, the same numerals with the prefix "1" have been utilized to identify like parts. In general, the accessory 110 is similar to that described in connection with the first embodiment except that while the latter is shown as an entirely imperforate member, accessory 110 is provided with an opening 150 in a heel portion of its wall 114 to provide free air passage through the rear opening 150 and between adjacent heel portions of the horseshoe 120, as desired.

Thus, it will be seen that a horseshoe of varying height having different size calks, e.g., is readily accommodated by an accessory of the above described type to eliminate tilting of the foot and thus alleviate muscle soreness and strain in the ankle area of the horse. Since the annular wall of the accessory substantially envelops the hoof, damage to the walls of the hoof frequently incurred by so-called "stall walkers" will be minimized as will the spreading of the horseshoe due to being kicked against hard surfaces, while the accessory additionally provides a safety feature in minimizing possible injury to horses and handlers upon being kicked. Obviously, the accessory is quick and easy to mount on the hoof and is readily removed when it is desired to run the horse.

As will be apparent to persons skilled in the art, various modifications, adaptations and variations of the foregoing specific disclosure can be made without departing from the teachings of the present invention.

I claim:

1. For use with a shod hoof of a horse having a horseshoe of varying height, a prophylactic accessory including a sole removably attachable to the horseshoe, the sole completely underlying a sole portion of the horse and a tread of the horseshoe, the sole having a generally flat bottom surface and an upper surface with a generally U shaped peripheral groove providing an upper horseshoe-seating surface enveloping the tread of the horseshoe, the horseshoe-seating surface substantially conforming in configuration to the tread of the horseshoe and defining a peripheral sole portion of varying height in inverted relation to that of the horseshoe, the horseshoe and said peripheral sole portion jointly being of a combined generally uniform height providing an even support for the horse, the upper surface of the sole being disposed inwardly of said peripheral groove and substantially conforming in configuration to the natural surface contour of the sole portion of the horse.

2. The accessory of claim 1 further including an upper annular wall integral with the sole for close fitting engagement with sidewalls of the hoof.

3. The accessory of claim 2 wherein the accessory is an integral one-piece member formed of a tough, resilient elastomeric material of high impact strength for detachable mounting on the hoof of the horse in close fitting engagement by the resiliency of its material.

4. The accessory of claim 1 wherein the upper surface of the sole substantially conforming in configuration to the natural surface contour of the sole portion of the horse is formed by a removable pad disposed inwardly of said U shaped peripheral groove.

References Cited

UNITED STATES PATENTS

| | | | |
|---|---|---|---|
| 359,897 | 3/1887 | Shurtz | 168—4 |
| 601,541 | 3/1898 | Anderson | 168—4 |
| 609,551 | 8/1898 | Lang | 168—1 |
| 665,530 | 1/1901 | Johnson | 168—2 |
| 759,636 | 5/1904 | Ryan | 168—28 |
| 836,386 | 8/1907 | Hallanan | 168—28 |
| 2,041,538 | 5/1936 | Gash et al. | 168—4 |
| 2,191,834 | 2/1940 | Slack | 168—28 |

ALDRICH F. MEDBERY, Primary Examiner

U.S. Cl. X.R.

54—82